US007627345B2

(12) United States Patent
Neuhaus et al.

(10) Patent No.: US 7,627,345 B2
(45) Date of Patent: Dec. 1, 2009

(54) CIRCUIT ARRANGEMENT THAT FUNCTIONS AS AN INTERFACE BETWEEN A SIM CARD AND GSM MODEM

(75) Inventors: Hans-Jürgen Neuhaus, Berlin (DE); Marten Petschke, Berlin (DE)

(73) Assignee: Cinterion Wireless Modules GmbH, Munich (DE)

( * ) Notice: Subject to any disclaimer, the term of this patent is extended or adjusted under 35 U.S.C. 154(b) by 197 days.

(21) Appl. No.: 10/571,489

(22) PCT Filed: Sep. 9, 2003

(86) PCT No.: PCT/DE03/03030

§ 371 (c)(1),
(2), (4) Date: Mar. 9, 2006

(87) PCT Pub. No.: WO2005/026971

PCT Pub. Date: Mar. 24, 2005

(65) Prior Publication Data
US 2007/0026892 A1 Feb. 1, 2007

(51) Int. Cl.
*H04B 1/38* (2006.01)
(52) U.S. Cl. ............ 455/558; 455/550.1; 455/557; 379/93.06

(58) Field of Classification Search ............ 455/550.1, 455/557, 558, 551, 575.1, 90.3; 379/93.05, 379/93.06; 375/219, 220, 222; 307/10.5; 365/51, 52
See application file for complete search history.

(56) References Cited

U.S. PATENT DOCUMENTS

| 5,815,426 | A | * | 9/1998 | Jigour et al. ............ 365/51 |
| 5,923,187 | A | | 7/1999 | Maugars |
| 6,584,326 | B1 | | 6/2003 | Boydston et al. |
| 6,839,570 | B2 | * | 1/2005 | Hutchison et al. ........ 455/558 |
| 7,137,003 | B2 | * | 11/2006 | Krishnan et al. ........ 713/172 |
| 2002/0047045 | A1 | | 4/2002 | Song et al. |

* cited by examiner

*Primary Examiner*—Charles N Appiah
*Assistant Examiner*—Olumide T Ajibade Akonai
(74) *Attorney, Agent, or Firm*—Baker Botts L.L.P.

(57) ABSTRACT

The present disclosure relates to a circuit arrangement and a method for defining the signal direction in a data line between the interfaces of a SIM card and a GSM modem, without a control signal for the direction of data and without remote access. According to the disclosure, the transmission direction of the data signals is detected and as a result only one direction is permitted for the transmission, whilst detection in the opposite direction is simultaneously blocked.

18 Claims, 6 Drawing Sheets

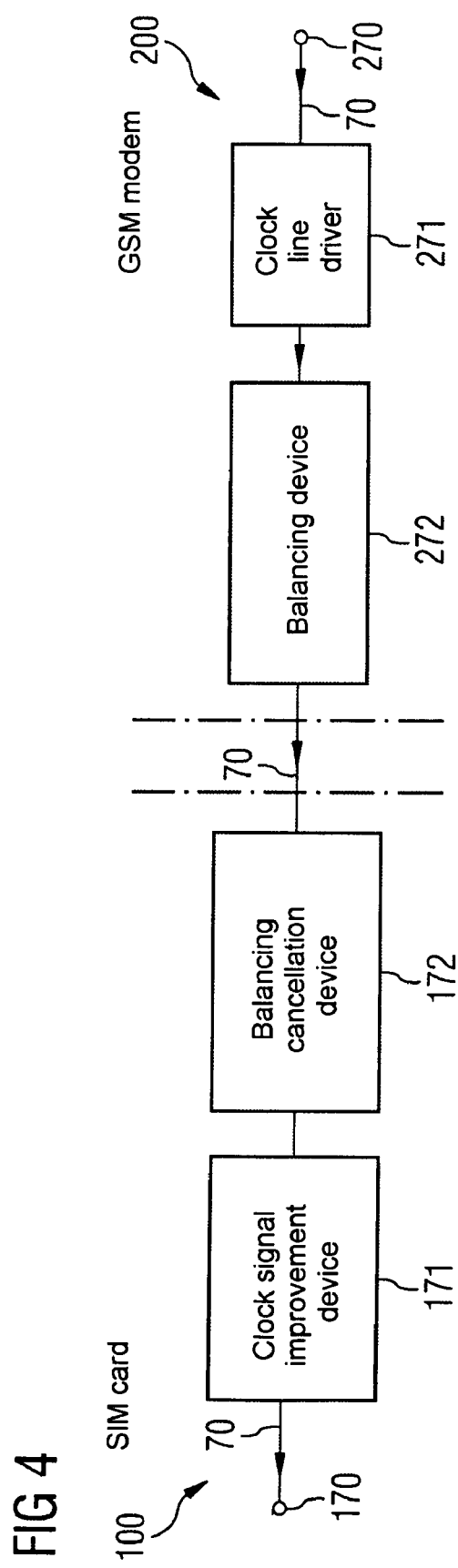

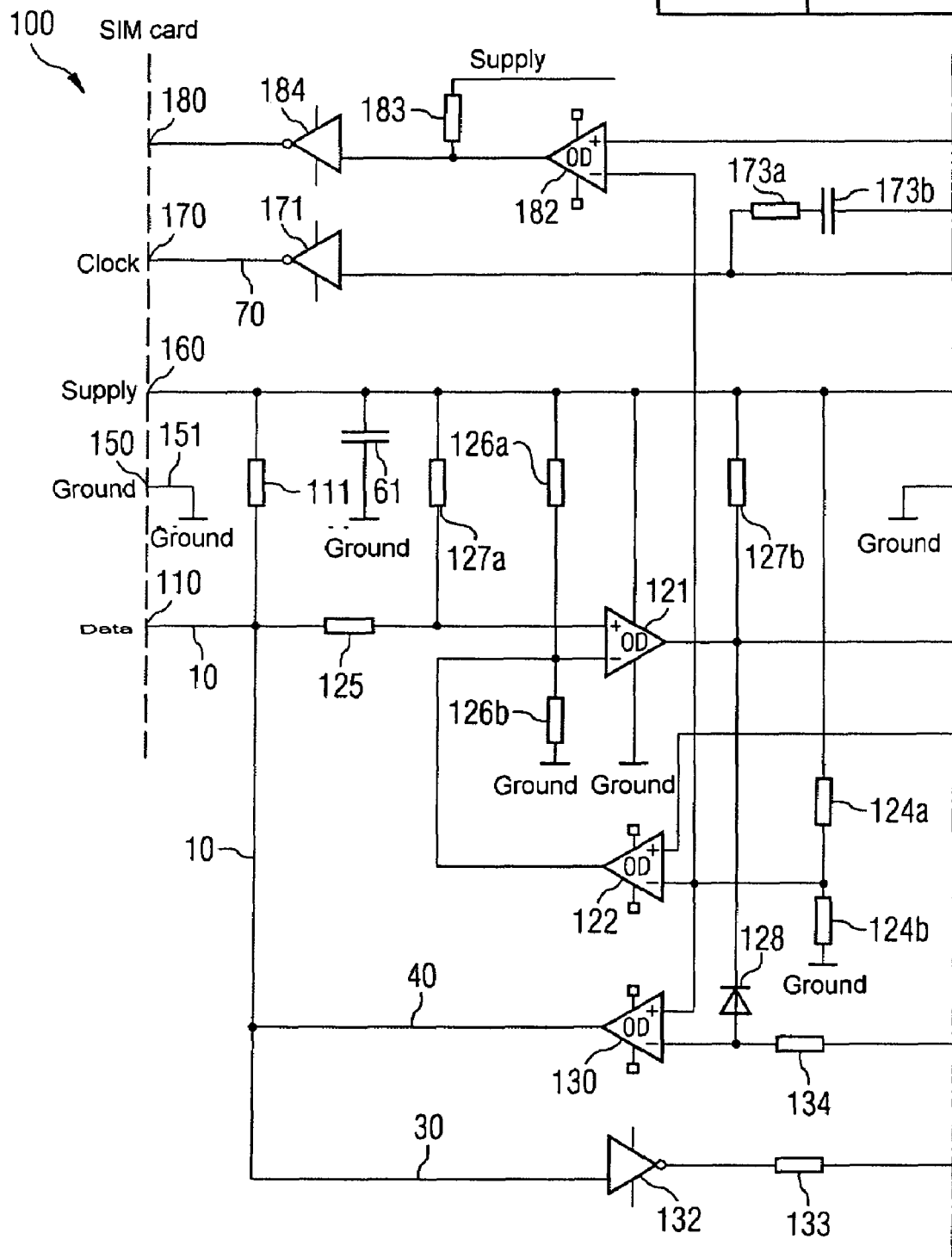

CIRCUIT ARRANGEMENT THAT FUNCTIONS AS AN INTERFACE BETWEEN A SIM CARD AND GSM MODEM

FIELD OF TECHNOLOGY

The present disclosure relates to and apparatus and method for signal direction definition in a data line between these interfaces.

BACKGROUND

SIM cards have become established as a standard for authentication of a user of a GSM mobile radio. In conventional GSM appliances, such as a mobile telephone, the card reader for SIM cards is integrated in the appliance. Further, as the functionality of GSM appliances increases, the importance of the SIM card is also growing since it is no longer used solely for checking the authorization to make telephone calls but for different applications, such as access authorization to secure areas, that is to say in the end as a key substitute, or for payment functions.

During this process, it has been found that, for some applications, it is desirable for the SIM card reader to be physically separated from the GSM appliance. For example, the SIM card may be inserted in an appropriate card reader in a motor vehicle in order in this way to authenticate a user for a GSM system in the vehicle. Furthermore, both in the private field and in the commercial field, a user may be authenticated via a SIM card reader for telephone systems, computers, network parts, automatic payment devices, or other appliances with GSM functionality. In this case, for security reasons, the aim is to provide a direct link between the card reader and the GSM appliance for the transmission of the authentication data and, in applications mentioned, this direct link often has to have a length of several meters, owing to the physical characteristics.

Generally, however, the electrical drivers for the SIM card interface in GSM modems are designed only for distances of less than 50 cm.

Integrated circuits are admittedly available which allow an "extension" to several meters. However, since the data line to the SIM card is designed to be bidirectional, these circuits require a control signal for the signal direction. However, no such signal is externally available on standard GSM modems. Circuits such as these are therefore designed only for direct integration in GSM modems and, furthermore, they are costly.

Another possibility is to use GSM modems with a remote access function for SIM data (so-called Remote SIM Access—RSA). In this case, the data is read in and out from the SIM card at a remote point, and is interchanged between the GSM modem and the SIM card by means of AT commands (Hayes standard command set for modems, of ATtention). The data may in this case be transmitted by wire or radio (for example Bluetooth). However, this solution is costly and, furthermore, depends on the use of GSM modems with RSA functionality, which are commercially available only in small numbers.

SUMMARY

Accordingly, a configuration is disclosed to provide capability for a link from a separate SIM card reader to a standard GSM modem, which neither provides any external signal for the data signal direction nor has any RSA functionality. At the same time, this is intended to create the basis for the capability to advantageously extend the connecting path to several meters.

Under an exemplary embodiment, a circuit arrangement is disclosed for connection between the interfaces of the SIM card reader and the GSM modem, which requires no external direction signal for the data line, since it autonomously identifies the signal direction. When it is intended to transmit signals via one of the two interfaces, the data line is then blocked in the opposite direction. Furthermore, the elements of the circuit are designed such that they can be subdivided into two groups, depending on whether it is processing signals from the SIM card reader or signals from the GSM modem.

Under the embodiment, the circuit can be distributed between two chips on the basis of these groups, with a line of the desired length being connected between the chips.

Data signal conditioning devices are preferably connected in each of the unidirectional data lines. This makes it possible to improve the quality of data signals which are adversely affected by being passed on via the long interface.

The first data signal blocking device, the first data signal conditioning device and the first opposite direction blocking element on the one hand, and the second data signal blocking device, the second data signal conditioning device and the second opposite direction blocking element on the other hand, are each preferably in the form of a single circuit element. This ensures that the circuit has a compact layout, ensures that the design is simpler and, in consequence, ensures simple and low-cost production as well as less susceptibility to faults.

Preferably, the first and the second unidirectional data line have a respective first and second line driver which, in particular, is a push-pull line driver with a low impedance, and which couples the respective data signals to the unidirectional data line. Line drivers such as these improve the quality of the data signal and reduce the probability of data losses.

In this case, a first and a second resistor are preferably connected in series with the respective first and second line driver. These resistors are used for line matching, to prevent or reduce reflection of electromagnetic waves.

The first and the second data signal direction identification device, the first and the second data signal blocking device, as well as the first and the second direction identification blocking device are preferably in the form of comparators, in particular with a threshold voltage of 1.5 V. This applies for the conventional 3 volt supply voltage in the applicable SIM standard, and comparators are very simple modules, which carry out the relevant tasks.

In a further embodiment, the elements, which in each case occur in pairs, are subdivided into two groups each having one element of each pair, with one group being arranged physically close to the SIM card and the other group being arranged physically close to the GSM modem, and connecting lines between elements from different groups may have lengths of up to several meters. It is thus possible to connect a SIM card to a GSM modem that is arranged separated from it by a corresponding distance, without any supporting functionality for such remote access being required of the GSM modem.

A clock line preferably connects a clock output of the GSM modem to a clock input of the SIM card. In this case, a clock signal improvement device and a clock line driver, in particular a push-pull line driver with a low impedance, is interposed on the clock line which couples the clock signal to an extension line with a length of up to several meters. Clock line drivers and the improvement device ensure that quality losses in the clock signal are compensated for via a clock line with a length of several meters, so that the SIM card and GSM modem can be arranged at a corresponding distance from one another.

A production device and a termination device for an inverted signal are advantageously connected in parallel with the clock line. The clock signal can thus be transmitted in a balanced form, thus reducing the emitted electromagnetic radiations. A third and a fourth resistor, respectively, are preferably connected in series with the production device and the clock line driver. These resistors are used for line matching.

A reset line advantageously connects a reset output of the GSM modem to a reset input of the SIM card, with which a reset signal improvement device is interposed. This makes it possible to compensate for quality losses in the reset signal during transmission, particularly if the reset line is relatively long.

BRIEF DESCRIPTION OF THE DRAWINGS

The various objects, advantages and novel features of the present disclosure will be more readily apprehended from the following Detailed Description when read in conjunction with the enclosed drawings, in which:

FIG. 4 shows a detail of the circuit arrangement shown in FIG. 1, which represents a block diagram of the clock line.

DETAILED DESCRIPTION

Figure 1:
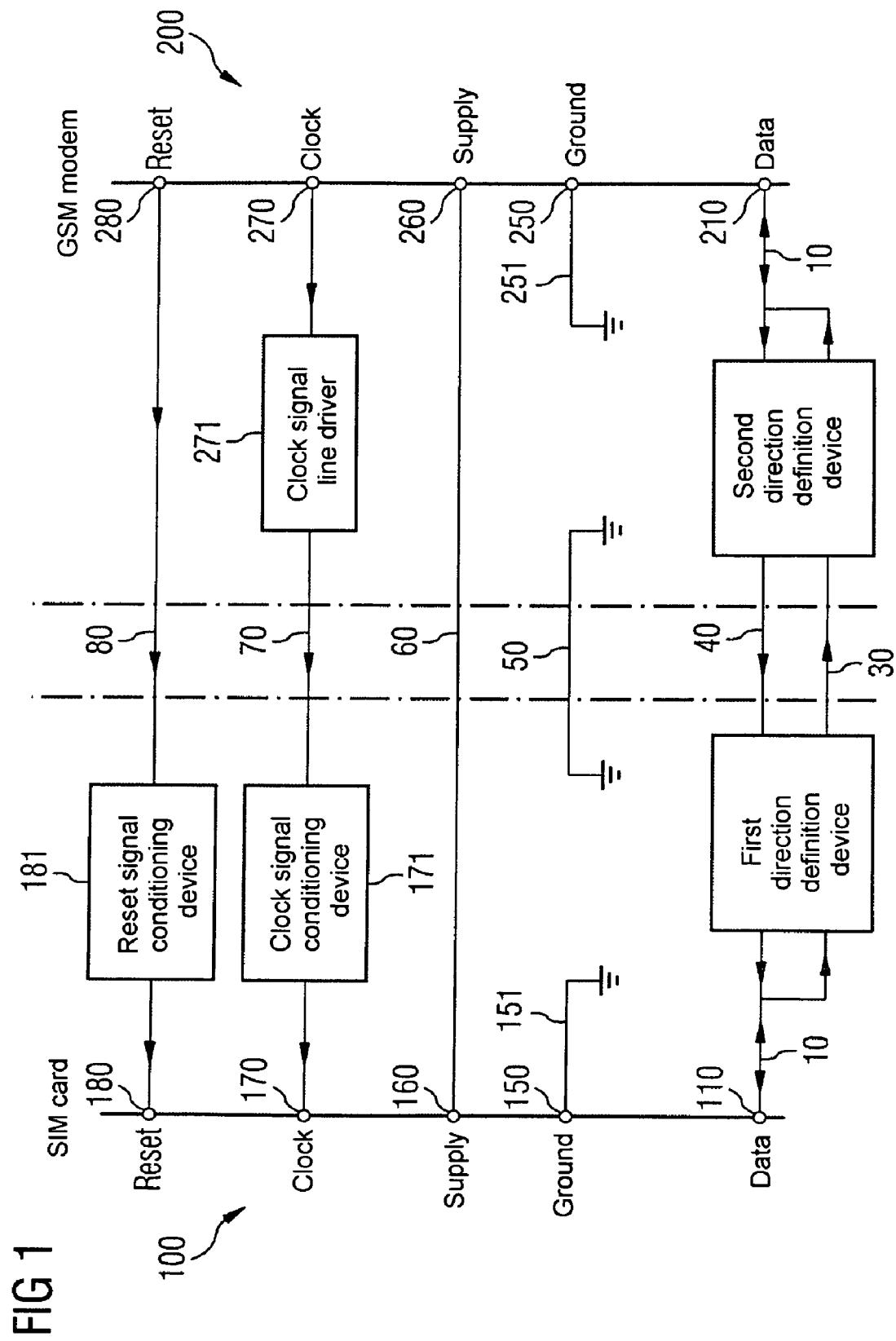
FIG. 1 shows a block diagram of a circuit arrangement according to an embodiment, wherein five individual lines are used to form the interface between a SIM card 100 and a GSM modem 200; a data line 10, a ground line 50, a supply line 60, a clock line 70 and a reset line 80.

The bidirectional data line 10 branches into a first unidirectional data line 30 whose signal direction is from a card data input/output 110 of the SIM card 100 to a modem data input/output 210 of the GSM modem 200, and a parallel, second unidirectional data line 40 whose signal direction is from the modem data input/output 210 to the card data input/output 110. The line direction of all the direction-specific lines 30, 40, 70, 80 is represented by arrows in FIG. 1.

A first direction definition device 120 (which is arranged relatively close to the SIM card 100) as well as a second direction definition device 220 (which is arranged relatively close to the GSM modem 200) are arranged in series in the first and in the second unidirectional data line 30, 40.

The first direction definition device 120 is able to identify the transmission of a data signal at the card data input/output 110, and then to block the second direction definition device 220 as well as the second unidirectional data line 40 in their forward direction. In consequence, when a data signal is being transmitted from the SIM card 100 to the GSM modem 200, only the first unidirectional data line 30 can pass the data signal, while data signals in the opposite direction are completely blocked. In a corresponding manner, the second direction definition device 220 is able to identify the transmission of a data signal at the modem data input/output 210, and then to block the first direction definition device 220 as well as the first unidirectional data line 30 in their forward direction, so that only the second unidirectional data line 40 from the GSM modem 200 to the SIM card 100 can pass data signals, and data signals in the opposite direction are completely blocked.

It is also possible to ensure that the SIM card 100 and the GSM modem 200 never transmit data signals via the data line 10 at the same time but that transmission only ever takes place in one of the two directions, since the opposite direction is blocked during this transmission.

The ground line 50 connects ground connections of the circuit elements which are arranged in the vicinity of the SIM card 100 to ground connections of the circuit elements which are arranged in the vicinity of the GSM modem 200. A card ground line 151 carries the ground potential from a card ground pin 150 on the SIM card to the exterior, and a modem ground line 251 carries the ground potential from a modem ground pin 250 on the GSM modem 200 to the exterior. Thus, overall, this ensures that the same ground potential is used throughout the entire circuit arrangement, as well as in the SIM card 100 and in the GSM modem 200.

The supply line 60 connects a card supply pin 160 on the SIM card to the modem supply pin 260 on the GSM modem. On the basis of the current SIM standard, a voltage of 3.0 volts is provided, although the invention is not restricted to this voltage. It is usual for the GSM modem 200 to supply a voltage to the SIM card 100.

The unidirectional clock line 70 connects a modem clock output 270 of the GSM modem 200 to a card clock input 170 of the SIM card 100. A clock signal conditioning device 171 is provided in the vicinity of the SIM card 100, and a clock line driver 272 is arranged in the vicinity of the GSM modem 200, in order to condition the clock symbol (which loses quality during the transmission through the clock line 70) for transmission in advance and subsequently.

The unidirectional reset line 80 connects a modem reset output 280 of the GSM modem 200 to a card reset input 180 of the SIM card 100. A reset signal conditioning device 181 in the vicinity of the SIM card 100 conditions the reset signal after transmission for the SIM card 100.

The two dashed vertical lines in FIG. 1 indicate one possible way to separate the circuit elements into two groups, with one group being physically associated with the SIM card 100, and the other group being associated with the GSM modem 200. The connecting lines which are located in the area between the two dashed vertical lines in FIG. 1 may then be lengthened up to several meters in order to arrange the SIM card 100 and/or the associated SIM card reader which is not illustrated, and the GSM modem 200 at a distance of up to several meters apart from one another.

Figure 2:
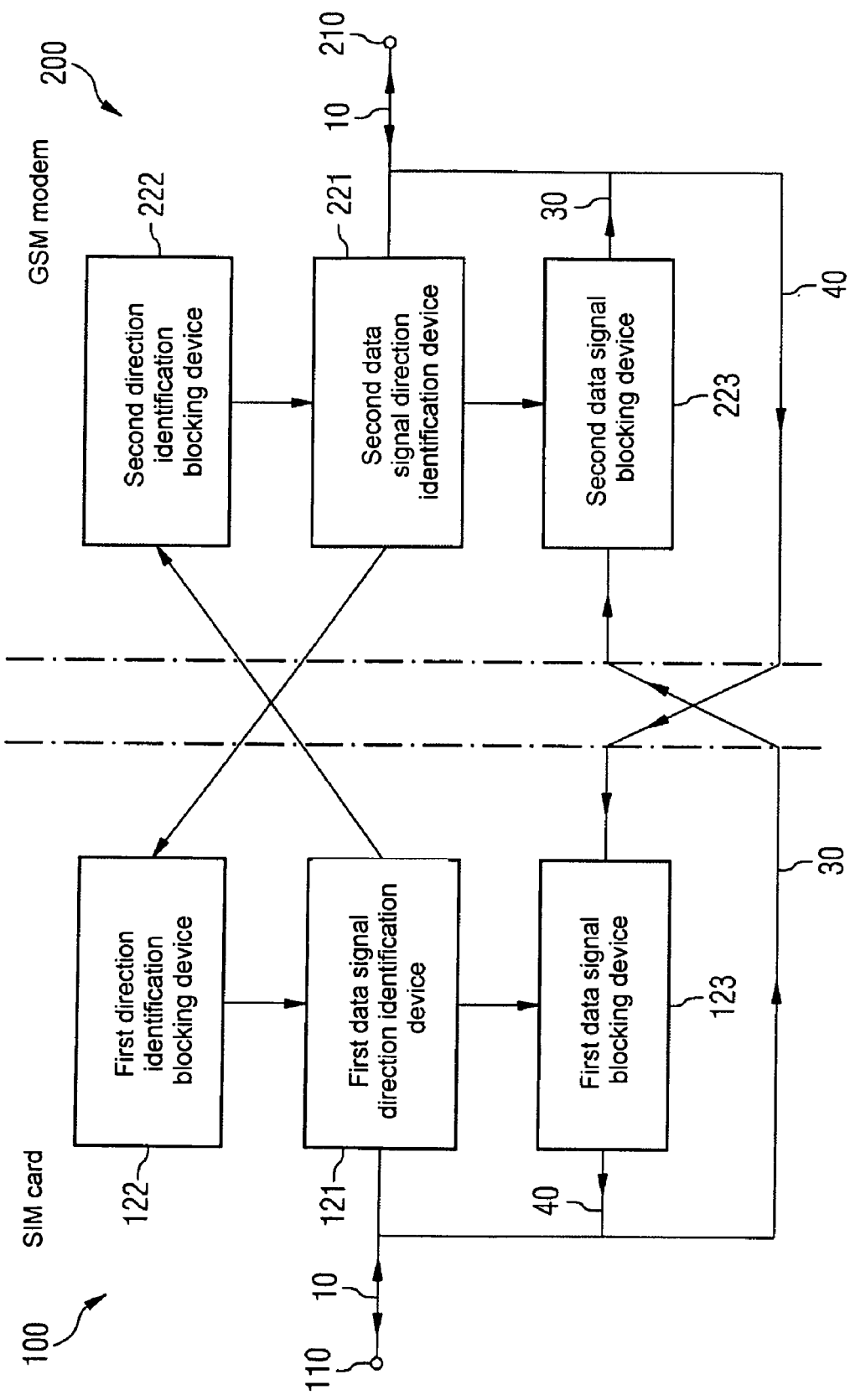
FIG. 2 shows a detail of the circuit arrangement shown in FIG. 1, which represents a first embodiment of the data line.

FIG. 2 shows an exemplary embodiment of the data line 10 with the associated circuit elements in the form of a detail from FIG. 1, also illustrating details which cannot be seen in FIG. 1. In this case, the first and second direction definition devices 120, 220 are each split into three sub-elements, specifically a first and a second data signal direction identification device 121, 221, a respective first and second direction identification blocking device 122, 222, as well as a respective first and second data signal blocking device 123, 223. The first and second data signal blocking devices 123, 223, respectively, which can also block the data signal line in the respective forward direction, are connected in the respective parallel first and second unidirectional data lines 30, 40.

The data line 10 additionally branches from the card data input/output 110 into a third parallel branch, which is connected to an input of the first data signal direction identification device 121. Its first output is connected to one input of the second direction identification blocking device 222, and its output is in turn connected to one input of the second data signal direction identification device 221. A second output of the first data signal direction identification device 121 is connected to one input of the first data signal blocking device 123.

In an entirely analogous manner, the data line 10 from the modem data input/output 210 also in addition branches into a third branch, parallel to the two unidirectional data lines 30, 40, and connected to one input of the second data signal direction identification device 221. Its first output is connected to one input of the first direction identification blocking device 122, and its output is in turn connected to one input of the first data signal direction identification device 121. A second output of the second data signal direction identification device 221 is connected to one input of the second data signal blocking device 223.

In a corresponding manner to that shown in FIG. 1, the circuit elements can be subdivided into two groups, which are respectively arranged close to the SIM card 100 and close to the GSM modem 200, in which case lines which connect elements from different groups may have lengths of up to several meters. These lines are arranged in the area between the two vertical dashed lines in FIG. 2.

A description will now be provided of how a transmission data signal which is present at the card data input/output 110 is transmitted to the modem card input/output 210, with the line being blocked in the opposite direction in this case. The converse situation of transmission from the GSM modem 200 to the SIM card 100 then requires no further explanation, due to the symmetrical arrangement.

In a rest state, all the elements in the direction definition devices 120, 220 are deactivated. A data signal which is now produced at the card data input/output 110 is passed via the third parallel branch to the input of the first data signal direction identification device 121, which identifies a data signal in the direction from the SIM card 100 to the GSM modem 200. Via its first output, the data signal direction identification device 121 then activates the second direction identification blocking device 222. At the same time, via its second output, it activates the first data signal blocking device 123. Via its output, the second direction identification blocking device 221 blocks the second data signal direction identification device 222. In particular, this also prevents the second data signal direction identification device 222 from being able to block the first data signal direction identification device 122 or the second data signal blocking device 223 if a transmission data signal occurs at the same time, or later, at the modem data input/output 210 as well.

The transmission data signal at the card data input/output 110 also in parallel reaches the two unidirectional data lines 30, 40. It is applied to the first unidirectional data line 30 in the forward direction, and the second data signal blocking device 223 is deactivated. In consequence, the data signal can be transmitted without any impediment to the modem data input/ output 210. It is in the reverse direction for the second unidirectional data line 40, and in consequence cannot be passed on here.

Thus, because the first data signal direction identification device 121 and the first data signal blocking device 123 are activated at this time, while the second data signal direction identification device 221 as well as the second data signal blocking device 223 are deactivated, any transmission data signal which may subsequently be produced at the modem data input/output can neither activate the second data signal direction identification device 221 nor can it be transmitted by one of the two unidirectional data lines 30, 40. The first unidirectional data line 30 is reached by it in the opposite direction, and the first data signal blocking device 123 provides blocking in the second unidirectional data line 40.

Once the transmission of the transmission data signal has been completed, wherein there is no longer a transmission data signal at the card data input/output, all of the activated circuit elements in the data line 10 are deactivated until a transmission data signal once again occurs on the SIM card 100 or at the GSM modem 200.

Thus, overall, this makes it possible to ensure that the SIM card 100 and the GSM modem 200 never transmit data signals via the data line 10 at the same time. If transmission data signals occur virtually at the same time both at the card data input/output 110 and at the modem data input/output 210, then the minimal time or line speed differences which are always present mean that one of the two direction definition devices 120, 220 will block the other, so that the data signals can nevertheless still be transmitted only in one direction until the current data transmission process has been completed.

Figure 3:
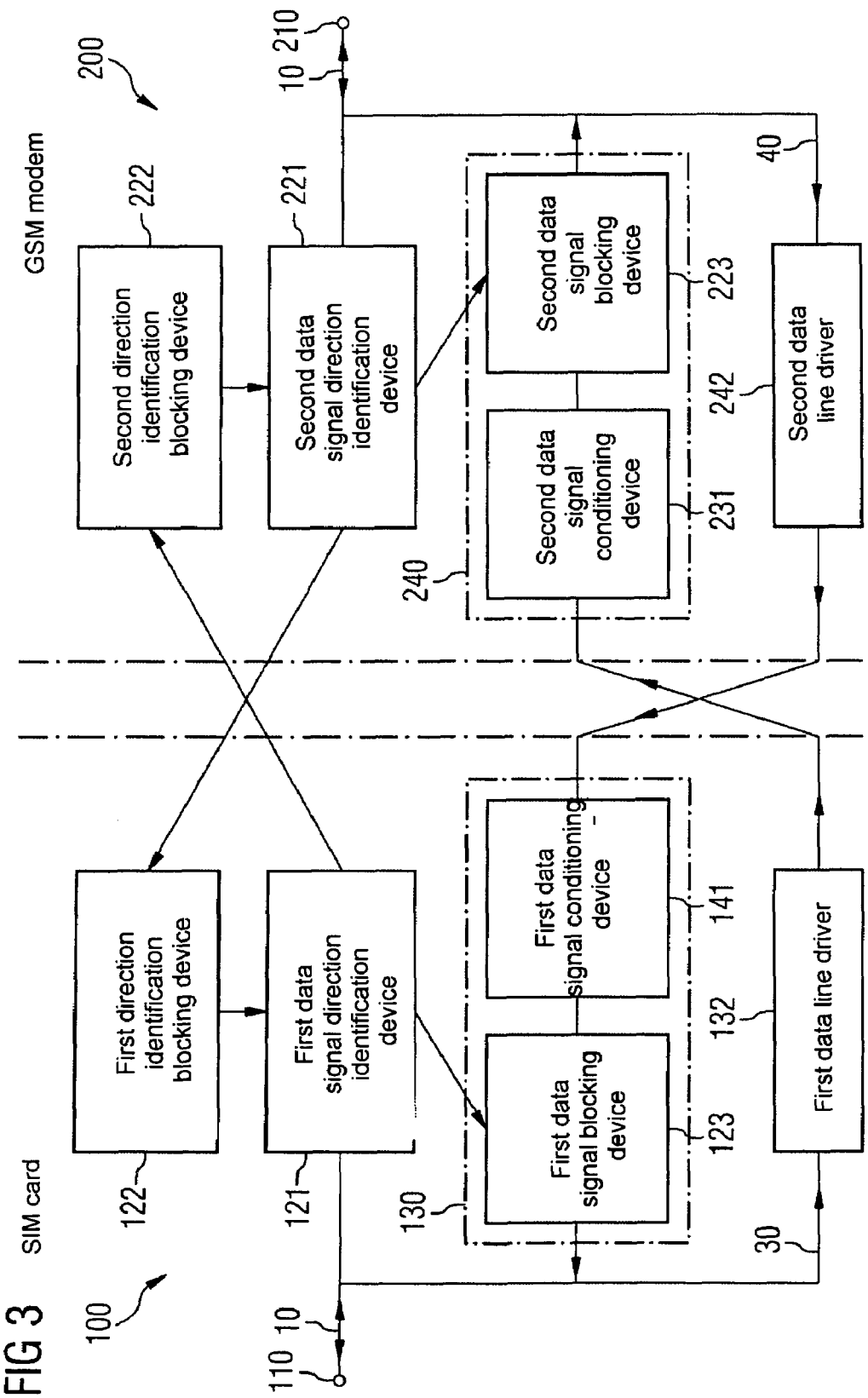
FIG. 3 shows a detail of the circuit arrangement shown in FIG. 1, which represents a second embodiment of the data line.

FIG. 3 shows a second embodiment of the data line 10 with the associated circuit elements as a detail from FIG. 1. Only those elements which differ from those in the first embodiment as illustrated in FIG. 2 will be described.

A first data line driver 132 is connected in the first unidirectional data line 30 in the vicinity of the SIM card 100, and a data signal conditioning device 231 (which is referred to in the following text as the "second") is connected in the first unidirectional data line 30 in the vicinity of the GSM modem 200. Analogously, a second data line driver 242 is connected in the second unidirectional data line 40 in the vicinity of the GSM modem 200, and a first data signal conditioning device 141 is connected in the second unidirectional data line 40 in the vicinity of the SIM card 100. In this case, the first and second data signal conditioning devices 141, 231 together with the respective second and first data signal blocking devices are in the form of respectively integral first and second conditioning/blocking elements 130 and 240.

The function of the data line drivers 132, 242 is to convert the data signal to a signal which is suitable for transmission over a relatively long data line with a length of up to several meters, while the data signal improvement devices 141, 231 convert the data signal back again, after this transmission, to a data signal format which can be understood by the SIM card 100 and by the GSM modem 200. This solves the problem that data signals can be transmitted over only a short distance of up to half a meter in conventional SIM card readers and GSM modems.

FIG. 4 shows a detail of the circuit arrangement shown in FIG. 1, illustrating the block diagram of the clock line additionally with those details which cannot be seen in FIG. 1.

A clock line driver 271 and a balancing device 272 are connected in series in the clock line 70 in the vicinity of the GSM modem 200, and a balancing cancellation device 172 as well as a clock signal conditioning device 171 are connected in series in the clock line 70 in the vicinity of the SIM card 100. The function of the clock line driver 271 and of the clock signal cancellation device 171 is the same as that of the corresponding elements in the data line 10, that is to say the preparation and conditioning of the clock signal for covering a line length of several meters.

The balancing device 272 balances the clock signal for transmission via the clock line, while the balancing cancellation device 172 converts the balanced clock signal back to a clock signal with a single polarity again. The balanced transmission has the advantage that it reduces the emitted electromagnetic radiation, since the electromagnetic waves can at least partially cancel one another out outside the clock conductor.

Figure 5B:
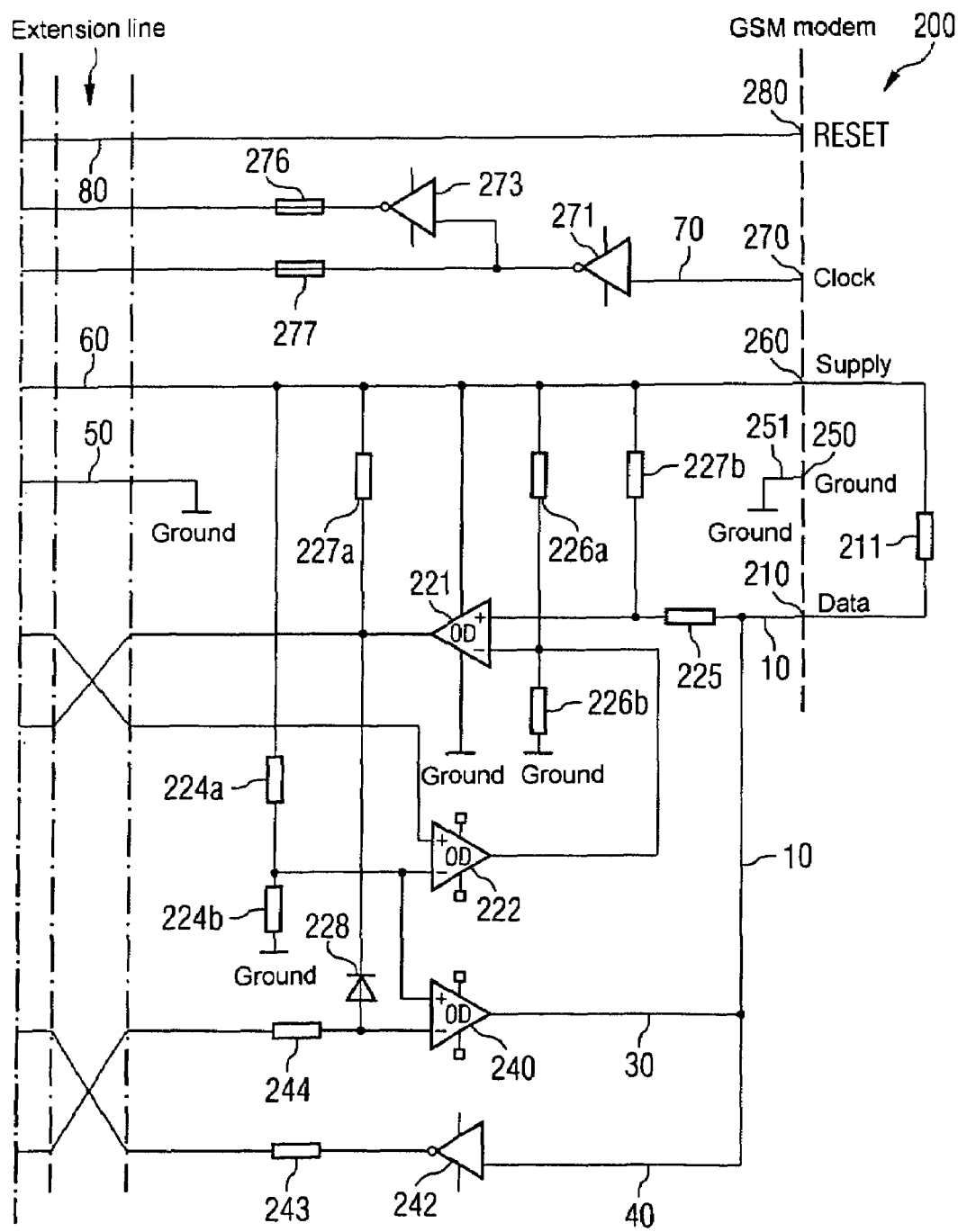
FIG. 5 shows a complete circuit diagram of the circuit arrangement according to the invention as shown in FIG. 1.

FIG. 5 shows a complete circuit diagram of the circuit arrangement according to the invention, from FIG. 1. In this case, and in contrast to FIG. 1, the illustration shows not only functional blocks but conventional individual circuit elements, in order to illustrate one exemplary embodiment of the invention. Wherever possible, the following text uses the same reference symbols as above, when the circuit elements are analogous to the functional elements which have already been introduced above. In this case, completely identical elements will not be described again.

The general configuration relating to the data line 10, the ground line 50, the supply line 60, the clock line 70 and the reset line 80 is also shown in FIG. 5. In the area which is bounded by the two dashed vertical lines, the lines are in the form of extension lines, and may have lengths of up to several meters.

The card data input/output 110 and the modem data input/output 210 (when in the function of being an output) are in the form of an open collector (or an open drain), in accordance with the ISO standard A card collector resistor 111 is thus connected between the supply line 60 and the card data input/output 110, and a modem collector resistor 211 is connected between the supply line 60 and the modem data input/output 210. The two collector resistors 111, 211 are of the order of magnitude of 3-20 kΩ, with the modem collector resistor 211 generally already being integrated in the GSM modem.

The data line 10 branches into the parallel first and second unidirectional data lines 30, 40, and into a third parallel branch. In this case, inverter gates are respectively provided as first and second data line drivers 132, 242 in the unidirectional data lines 30, 40. The data line drivers 132, 242 may be gates based on HCMOS technology (High performance Complementary Metal Oxide Semiconductor), but this choice depends on the line capacity to be driven. A first data driver resistor 133 is connected in series with the first data line driver 132, and a second data driver resistor 243 is connected in series with the second data line driver 242. These data driver resistors are used for line matching, that is to say they prevent or reduce the reflection of electromagnetic waves in the conductor, and they ensure that the gradient of the signal flanks is limited, thus ensuring reduced emitted radiation, that is to say a better EMC behavior (Electromagnetic Compatibility).

A comparator, which is connected as an inverting threshold voltage comparator, is in each case provided as the integrated first and second conditioning/blocking element 130, 240, that is to say it is at the same time used as the first and the second data signal blocking device 123, 223, respectively, and as the first and the second data signal conditioning device 141, 231, respectively. The first or the second unidirectional data line 30, 40, respectively, is connected via a respective series resistor 134, 244 to the one, inverting input of these comparators 130, 240, and the threshold value voltage is applied to the second, non-inverting input, via in each case two resistors 124a, 124b and 224a, 224b, which are connected to ground 50 and to the supply voltage 60 as a voltage divider. If the resistors 124a, 124b and 224a, 224b have the same magnitude, then they result in the threshold value voltage being set to half the supply voltage, in particular to 1.5 volts for a supply voltage of 3.0 volts. If the comparators have open collector outputs, as, in particular, in the case of LP339 comparators, then their outputs can be connected, as illustrated, directly to the card or modem data inputs/outputs 110, 210.

The comparators 130, 240 at the same time also define the forward direction of the unidirectional data lines 30, 40, that is to say they are respectively used as the first and second opposite direction blocking elements.

The first and second data signal direction identification devices 121, 221 are likewise in the form of comparators. The data line 10 is in each case connected to the non-inverting input of the first and second data signal direction identification devices 121, 221 via a respective first or second identification device resistor 125, 225. The threshold value voltage is applied to the second inverting input via in each case two resistors 126a, 126b, or 226a, 226b, which are connected as a voltage divider to ground 50 and to the supply voltage 60. If these resistors 126a, 126b and 226a, 226b are also of the same magnitude, then they set the threshold value voltage to half the supply voltage, in particular to 1.5 volts for a supply voltage of 3.0 volts.

Upstream of the non-inverting input and downstream from the output of the first or the second data signal direction identification device 121, 221, respectively, the supply line 60 is connected to the third branch of the data line 10 via a respective resistor 127a, 127b or 227a, 227b. The outputs of the first and the second data signal direction identification devices 121, 221 is connected via first and second respective diodes 128, 228 to the inverting input of the respective first and second integrated conditioning/blocking element 130, 240, and via the extension line to a non-inverting second and first respective direction identification blocking devices 222, 122.

In this case, the first and second direction identification blocking devices 122, 222 are also in the form of comparators, and their respective second inverting input in each case receives the threshold voltage via the voltage divider 124a, 124b or 224a, 224b, respectively, while their outputs are connected to the inverting input of the first and second respective data signal direction identification devices.

The operation of the circuit arrangement for the transmission of a data transmission signal from the modem data output/input 210 to the card data output/input 110 will be described in the following text. For symmetry reasons, no further explanation is required for a data transmission process in the opposite direction. The procedure when data is transmitted at the same time in both directions has already been described above in conjunction with FIG. 2.

In the rest state, the modem data output/input 210 is at a HIGH level owing to the pull-up resistor 211 which is integrated in the GSM modem 200. A soon as the GSM modem 200 starts to transmit, this is signaled by a LOW level. This leads to a LOW level at the output of the second data signal direction identification device 221. This LOW signal is produced via the second diode 228 at the inverting input of the second improvement/blocking element 240, and leads to the first unidirectional data line 30 being blocked. No data signal can therefore be transmitted from the SIM card 100.

The LOW level at the output of the second data signal direction identification device 221 also acts via the extension line on the non-inverting input of the first direction identification blocking device, and whose output then produces a LOW signal. At the inverting input of the first data signal direction identification device 121, this results in blocking of the non-inverting input; the output of the first data signal direction identification device 121 remains at a HIGH level, irrespective of the non-inverting input. Although a data transmission signal from the card data input/output 110 is now applied to the non-inverting input of the first data signal direction identification device 121, it cannot produce a LOW level at the output:

The first data signal direction identification device 121 is blocked.

The HIGH level of the output of the first data signal direction identification device 121 is passed via the extension line to the non-inverting input of the second direction identification blocking device 222, and its output remains open (open collector). The second direction identification blocking device 222 can therefore not block the second data signal direction identification device 221 which has initiated the direction definition process.

The data line 10 can thus pass data signals only in the direction from the GSM modem 200 to the SIM card 100, and the circuit elements on the data line 10 have the same functionality for direction definition and for carrying the data in a better manner, which has been described above in conjunction with FIGS. 1 to 3.

The ground line 50 has the same configuration as that described in conjunction with the block diagrams relating to FIG. 1.

The only additional item in the supply line 60 is the capacitor 61, which is connected to ground and is used for decoupling the operating voltage from the line conditions. In accordance with the applicable SIM standard, the supply voltage is 3.0 volts, although the invention is not restricted to this. The resistance of the supply line 60 should be as low as possible.

The clock line driver 271 for the clock line 70 is in the form of a simple gate. The clock signal conditioning device 171 is likewise in the form of a gate, although this gate may also be omitted if the power capacities are relatively low, for example in the case of a relatively short extension line.

The balancing device 272 is in the form of a branch in parallel with the clock line, with the clock signal being inverted by a gate 273 in one branch. On the opposite side, in the branch with the inverted clock signal, a resistor 173a and a capacitor 173b are used as a termination, in fact with the two parallel branches being joined together again. This forms the balancing cancellation device 172 on the opposite side. Since the clock signal frequency is relatively high (approximately 1-4 MHz), the reduced emitted electromagnetic radiation resulting from this balanced signal transmission is desirable.

A first and a second clock line resistor 276, 277 are respectively connected in series with the clock line driver 271 and with the inverting gate 273 in the balancing device 272. These resistors are used for line matching, in an entirely analogous manner to the first and second data driver resistors 133, 243.

The signal can be transmitted without a separate driver on the reset line 80. The reset signal improvement device 181 comprises a comparator 182, which receives its threshold value voltage from the voltage divider 124a, 124b, and which is connected at the output via a reset resistor 183 to the supply line. In the following text, a gate 184 is also connected in series with the output of the comparator 182. The reset signal improvement device 181 may also be omitted if the power capacities are relatively low, for example in the case of a relatively short extension line.

The circuit arrangement according to the invention thus conditions SIM signals at the GSM modem, and converts them back, at the SIM card holder, to signals which are compatible with the SN card, and vice versa. The signal conditioning process takes account, in particular, of the EMC requirements for emitted radiation characteristics.

At the same time, when a data signal is being transmitted, the circuit arrangement defines the transmission direction so that it is not possible to transmit in both directions at the same time: The end which is active first of all locks itself and renders the opposite end inoperative.

The circuit does not take any account of protective measures against electrostatic discharges (ESD). However, those skilled in the art will be familiar with how elements could be added for such measures.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. An interface apparatus between a SIM card and a GSM modem, comprising:
   a bidirectional data line connecting a card data input/output of the SIM card to a modem data input/output of the GSM modem;
   a branching area within said bidirectional line, wherein said branching area comprises a parallel first and second unidirectional data lines, each respectively comprising a first and a second opposite direction blocking element, such that the first unidirectional data line can pass data signals only in the direction from the SIM card to the GSM modem and the second unidirectional data line can pass data signals only in the opposite direction;
   a respective first and second data signal blocking device operatively coupled to the first and the second unidirectional data line, wherein the first and second data signal blocking device can in each case block data signals in the forward direction;
   a first and a second data signal direction identification device operatively coupled to the card and modem data input/output;
   wherein the respective first or second data signal direction identification device is operatively coupled to the respective second or first data signal direction identification device via a respective second or first direction identification blocking device; and
   wherein data signals are transmitted in only one direction so that the transmission of data signals from the SIM card is identified by the first data signal direction identification device, which then uses the second direction identification blocking device to block the second data signal direction identification device in the direction from the GSM modem to the SIM card, and the first data signal blocking device blocks the data line in the direction from the GSM modem to the SIM card; or
   wherein data signals transmitted from the GSM modem is identified by the second data signal direction identification device, which then uses the first direction identification blocking device to block the first data signal direction identification device in the direction from the SIM card to the GSM modem, and uses the second data signal blocking device to block the data line in the direction from the SIM card to the GSM modem.

2. The interface apparatus as claimed in claim 1, wherein a first data signal conditioning device is connected in the second unidirectional data line, and a second data signal conditioning device is connected in the first unidirectional data line.

3. The interface apparatus as claimed in claim 2, wherein the first data signal blocking device, the first data signal conditioning device and the first opposite direction blocking element on the one hand, and the second data signal blocking device, the second data signal conditioning device and the second opposite direction blocking element on the other hand, are each in the form of a single circuit element.

4. The interface apparatus as claimed in claim 1, wherein the first and the second unidirectional data line have a respective first and second push-pull data line driver, which couples the respective data signals to the unidirectional data line.

5. The interface apparatus as claimed in claim 4, wherein a first and a second data driver resistor are connected in series with the respective first or second data line driver.

6. The interface apparatus as claimed in claim 3, wherein the first and the second data signal direction identification device, the first and the second data signal blocking device, and the first and the second direction identification blocking device are comparators.

7. The interface apparatus as claimed in claim 6, wherein the comparators have a threshold voltage of 1.5 volts.

8. The interface apparatus as claimed in claim 1, wherein, of the elements which occur in pairs, one is in each case arranged physically close to the SIM card and the other is arranged physically close to the GSM modem, and connecting lines are provided between them.

9. The interface apparatus as claimed in claim 8, wherein the connecting lines have a length between 20 cm and several meters.

10. The interface apparatus as claimed in claim 1, wherein a clock line is connected to a modem clock output of the GSM modem to a card clock input of the SIM card, wherein a clock signal improvement device and a clock line driver are arranged on the clock line, and wherein the clock line driver couples the clock signal to an extension line.

11. The interface apparatus as claimed in claim 10, wherein a production device and a termination device for an inverted signal are connected in parallel with the clock line, in order to allow a balanced clock signal transmission.

12. The interface apparatus as claimed in claim 11, wherein a first and a second clock line resistor, are respectively connected in series with the production device and the clock line driver.

13. The interface apparatus as claimed in claim 1, wherein a reset line connects a modem reset output of the GSM modem to a card reset input of the SIM card, with which a reset signal improvement device is interposed.

14. A method for signal direction definition in a data line between the interfaces of a SIM card and a GSM modem, comprising:
transmitting data between the SIM card and the GSM modem via separate transmit and receive lines, wherein the signals on the transmit and receive lines are combined in said SIM card interface and said GSM modem interface, respectively;
identifying transmission data signals on the SIM card and at the GSM modem;
after identification of a transmission data signal on the SIM card, blocking the transmission of data signals from the GSM modem interface and furthermore blocking the identification of data signals in the GSM modem interface;
after identification of a transmission data signal at the GSM modem, blocking the transmission of data signals from the SIM card interface and furthermore blocking the identification of data signals in the SIM card interface; and
connecting a first data signal conditioning device to the receive line, and a second data signal conditioning device to the transmit line.

15. The method as claimed in claim 14, wherein the transmit and receive line each have respective first and second push-pull data line driver, which couples the respective data signals to the unidirectional data line.

16. The method as claimed in claim 14 wherein the transmit and receive lines have a length between 20 cm and several meters.

17. The method as claimed in claim 14, further comprising the step of connecting a clock line to a modem clock output of the GSM modem and to a card clock input of the SIM card, and improving a clock signal on said clock line by a clock signal improvement device and a clock line driver arranged on the clock line, wherein the clock line driver couples the clock signal to an extension line.

18. The method as claimed in claim 17, further comprising the step of connecting a production device and a termination device for an inverted signal in parallel with the clock line, in order to allow a balanced clock signal transmission.

* * * * *